June 3, 1930.  E. S. PATCH  1,761,533

BEARING FOR STEERING COLUMNS

Filed Dec. 12, 1927

Inventor
Earl S. Patch
By Spencer Hardman
and Fehr
His Attorneys

Patented June 3, 1930

1,761,533

UNITED STATES PATENT OFFICE

EARL S. PATCH, OF DAYTON, OHIO, ASSIGNOR TO THE MORAINE PRODUCTS COMPANY, OF DAYTON, OHIO, A CORPORATION OF OHIO

BEARING FOR STEERING COLUMNS

Application filed December 12, 1927. Serial No. 239,323.

The present invention relates to bearings, and more particularly to an improved type of bearing for use in supporting shafts or other members which are subject to considerable transverse vibration, such for example as the steering columns for motor vehicles.

One object of the invention is the provision of a bearing of the character described which shall be compressible so that when mounted in place about the shaft or other member which is to be supported, it will be slightly compressed between the movable shaft or member and an outer stationary supporting part and will absorb the vibration between said parts.

A further object of the invention is the provision of a bearing for this purpose having a bearing surface which will not require lubrication.

With these objects in view, a feature of the invention consists in the provision of a bearing having a compressible and elastic outer member supporting an inner bearing surface formed of a porous metallic material capable of absorbing a lubricant.

Further objects and advantages of the present invention will be apparent from the following description, reference being had to the accompanying drawings, wherein a preferred embodiment of one form of the present invention is clearly shown.

Figure 1:
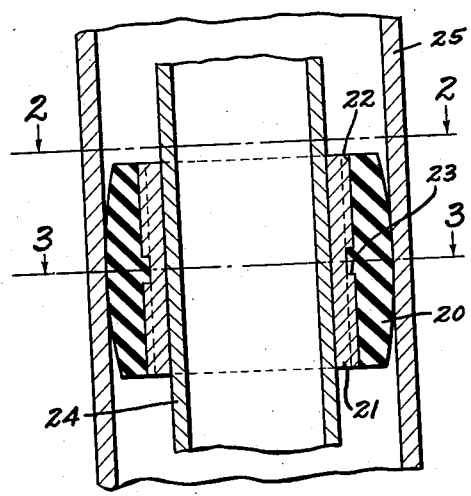
Fig. 1 is a sectional view showing the bearing in position between an inner rotating shaft and an outer stationary supporting sleeve.
Figure 2:
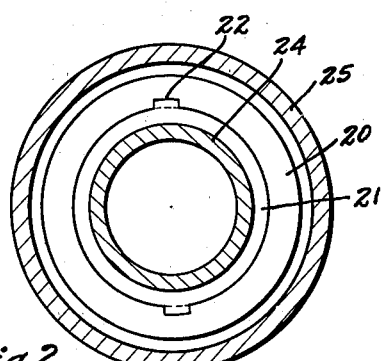
Fig. 2 is a section on the line 2—2 of Fig. 1.
Figure 3:
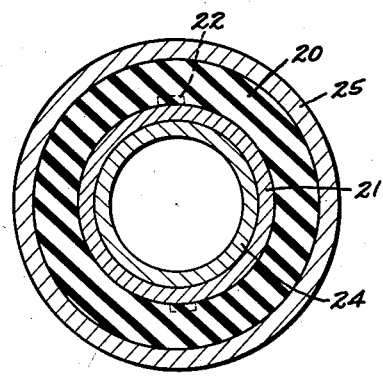
Fig. 3 is a section on the line 3—3 of Fig. 1.

With reference to Fig. 1, the reference numeral 20 indicates an outer substantially cylindrical, or tubular member, of compressible, elastic material, such for example as relatively soft rubber which is secured in a manner hereinafter more fully described to an inner tubular member sleeve 21 formed of porous metallic material. The manner in which the porous metallic member 21 is formed constitutes no part of this invention; but to facilitate understanding of the invention, the method of making said member 21 is hereinafter briefly described.

A mixture of metal powders such as copper and tin with graphite and a volatile void forming substance such as salicylic acid, is placed in a die and briquetted into the desired form at a pressure of 60,000 to 75,000 pounds per square inch. This form is then sintered by heating in a non-oxidizing atmosphere at a temperature and for a time sufficient to cause alloyage of the metals and to volatilize the salicylic acid which will form a structure interspersed with a large number of minute inter-communicating voids. The element is then immersed in a bath of hot lubricating oil which will be absorbed thereby. For a detailed description of the method of manufacture of porous metallic bodies of this character, reference is made to the patent to H. M. Williams, 1,642,347.

The inner tubular member 21, formed by the above or any other desirable method, is provided with projecting ribs 22 on the outer surface of said member, notches 23 being cut in said ribs. The outer rubber supporting member is secured to the inner sleeve by vulcanizing in a suitable mold, the rubber being in a fluent condition during the vulcanizing process so that when the rubber cools the projecting ribs 22 will enter corresponding recesses on the inner surface of the rubber member, while projecting portions of the rubber member will enter the notches 23 cut in said ribs. It will be obvious that the ribs 22 projecting into the rubber member will prevent any relative rotary motion between said member and the inner tubular member 21, while the projecting portions of the rubber member which enter notches 23 will prevent any relative longitudinal motion between the parts.

The bearing assembly formed in the manner above described is adapted to be positioned between an inner rotating shaft 24 and an outer stationary supporting sleeve or housing 25, as indicated in Fig. 1. Owing to the fact that the outer tubular member 20 is of relatively soft rubber, it may be compressed so that the bearing may be inserted in sleeves 25 of varying size. The outer member 20 is tapered at both ends, as indicated in Fig. 1, to facilitate insertion of the member in the supporting sleeve 20.

Figure 4:
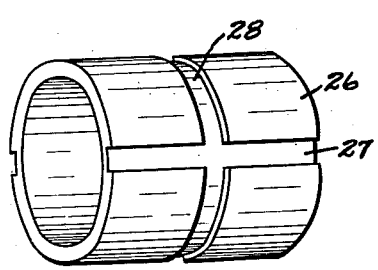
Fig. 4 is a perspective view of a modified form of the inner or bearing surface.

In Fig. 4 a somewhat modified form of porous metallic bearing member similar to the member 21 is indicated by the numeral 26. Instead of having ribs such as 22 projecting therefrom, the member 26 is provided with longitudinal channels 27 and circumferential channels 28 cut in the outer surface of said member. When the outer rubber member is vulcanized to this form of inner bearing member, projecting portions of the rubber will enter the channels 27 and 28 and prevent any relative movement either rotary or longitudinal between the two members constituting the bearing. A bearing formed with an inner bearing surface having the form shown in Fig. 4 is adapted to be positioned between a movable shaft and its outer supporting member in the same way as previously described.

The above described bearing is inexpensive to manufacture, is convenient to assemble in place, does not require lubrication from an external source, will absorb transverse vibration of the shaft and supporting sleeve and will prevent looseness and rattling of these members, because of the compressible and elastic material forming the outer member of said bearing. Further, the work to which a bearing of this nature is subjected is not severe and the bearing surface can be impregnated with sufficient lubricating material to provide effective lubrication for long periods. In addition, a bearing made in accordance with this invention will automatically adjust itself into alignment and similarly adjust itself to compensate for wear.

While the form of embodiment of the present invention as herein disclosed, constitutes a preferred form, it is to be understood that other forms might be adopted, all coming within the scope of the claims which follow.

What is claimed is as follows:

1. A bearing comprising a compressible, supporting member and a bearing surface secured thereto, said bearing surface being formed of a porous metallic element capable of absorbing a lubricant.

2. A bearing comprising a tubular supporting member of elastic material and a tubular bearing member of porous metallic construction secured thereto.

3. A bearing adapted to be inserted in supporting sleeves of different diameters comprising an outer tubular member of elastic, compressible material and an inner tubular bearing member formed of porous metallic material capable of absorbing a lubricant.

4. A bearing adapted to be inserted in supporting sleeves of different diameters comprising an outer tubular member of elastic, compressible material and an inner tubular bearing member formed of porous metallic material capable of absorbing a lubricant, said outer member being tapered at its ends to facilitate insertion of the supporting sleeve.

5. A bearing comprising a supporting member of soft rubber, and a bearing surface secured to said supporting member and formed of porous metallic material capable of absorbing a lubricant.

6. A bearing comprising an outer tubular supporting member of soft rubber and an inner tubular bearing member secured thereto and formed of porous metallic material capable of absorbing a lubricant.

7. A bearing comprising a tubular supporting member of elastic material and a tubular bearing member of porous metallic material, one of said members having projections formed thereon adapted to engage in corresponding recesses formed in the other member.

8. A bearing comprising a tubular supporting member of elastic material and a tubular bearing member of porous metallic material, said bearing member having projections thereon adapted to engage in corresponding recesses formed in said elastic member, so constructed as to prevent any movement of said members relative to each other.

9. A bearing comprising a tubular supporting member of elastic material and a tubular bearing member of porous metallic material, said bearing member having longitudinal ribs formed thereon adapted to engage in corresponding recesses formed in the elastic member, to prevent relative lateral movement of said members and notches formed in said ribs adapted to receive projecting portions of said elastic member to prevent relative longitudinal movement of said members.

10. A bearing comprising an elastic, compressible, supporting member having a bearing surface secured thereto, said bearing surface being formed of an oil impregnated material.

11. A bearing comprising an outer tubular supporting member of elastic, compressible material and an inner tubular bearing member of oil impregnated material.

In testimony whereof I hereto affix my signature.

EARL S. PATCH.